(12) United States Patent
Shibata et al.

(10) Patent No.: US 8,056,532 B2
(45) Date of Patent: Nov. 15, 2011

(54) DIRECT FUEL INJECTION DIESEL ENGINE

(75) Inventors: Mitsuhiro Shibata, Saitama (JP); Hiroshi Sono, Saitama (JP); Nobuhiko Sasaki, Saitama (JP); Tatsuya Uchimoto, Saitama (JP); Kenichiro Ikeya, Saitama (JP); Yutaka Tajima, Saitama (JP); Yukihisa Yamaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 12/305,342

(22) PCT Filed: Apr. 11, 2007

(86) PCT No.: PCT/JP2007/057987
§ 371 (c)(1),
(2), (4) Date: Dec. 17, 2008

(87) PCT Pub. No.: WO2007/148467
PCT Pub. Date: Dec. 27, 2007

(65) Prior Publication Data
US 2010/0006061 A1    Jan. 14, 2010

(30) Foreign Application Priority Data

Jun. 23, 2006   (JP) .................................. 2006-174089

(51) Int. Cl.
*F02F 3/24*   (2006.01)
(52) U.S. Cl. ......................... 123/307; 123/306; 123/661
(58) Field of Classification Search ................... 123/306, 123/307, 432, 661
See application file for complete search history.

(56) References Cited

U.S. PATENT DOCUMENTS

| | | | |
|---|---|---|---|
| 6,199,544 B1 * | 3/2001 | Feuling .......................... | 123/661 |
| 6,499,457 B2 * | 12/2002 | Suzuki et al. .................. | 123/295 |
| 2010/0108022 A1 * | 5/2010 | Sono et al. ..................... | 123/276 |

FOREIGN PATENT DOCUMENTS

| | | |
|---|---|---|
| DE | 1 907 391 A1 | 9/1970 |
| JP | 62-63124 A | 3/1987 |
| JP | 62-282114 A | 12/1987 |
| JP | 63-16124 A | 1/1988 |
| JP | 03-6827 Y2 | 2/1991 |
| JP | 06-94808 B2 | 11/1994 |
| JP | 10-184366 A | 7/1998 |
| JP | 2002-89266 A | 3/2002 |
| JP | 2003-227339 A | 8/2003 |
| JP | 2004-270476 A | 9/2004 |
| JP | 2006-152904 A | 6/2006 |

* cited by examiner

*Primary Examiner* — John Kwon
(74) *Attorney, Agent, or Firm* — Arent Fox LLP (57) ABSTRACT

In a direct fuel injection diesel engine having a piston with a pentroof-shaped top face, with regard to a pentroof-shaped piston (13) with a cavity (25) recessed in a central part of the top face, a radial width S of a squish area (26) formed between an outer peripheral part of the top face and a lower face of a cylinder head (14) changes in the circumferential direction of the piston (13). By setting a squish clearance H large for a portion where the radial width S of the squish area (26) is large and setting the squish clearance H small for a portion where the radial width S of the squish area (26) is small, more specifically, by setting S/H so that it is constant in the circumferential direction, it is possible to make the strength of the squish flow uniform in the circumferential direction of the piston, thus promoting the mixing of air and fuel and reducing harmful exhaust components.

3 Claims, 10 Drawing Sheets

DIRECT FUEL INJECTION DIESEL ENGINE

CROSS-REFERENCE TO RELATED APPLICATION

This application is a National Stage entry of International Application No. PCT/JP2007/057987, having an international filing date of Apr. 11, 2007; which claims priority to Japanese Application No. 2006-217246, filed Aug. 9, 2006 and Japanese Application No. 2006-174089, filed Jun. 23, 2006, the disclosure of each of which is hereby incorporated in its entirety by reference.

TECHNICAL FIELD

The present invention relates to a direct fuel injection diesel engine that includes a piston for which the height of a top face changes in the circumferential direction, and a fuel injector for injecting fuel into a cavity recessed in a central part of the piston, a ratio D/B of a cavity entrance diameter D to a cylinder bore diameter B in a plane perpendicular to a piston central axis changing in the circumferential direction.

BACKGROUND ART

In general, the top face of a piston of a direct fuel injection diesel engine is formed flat, but a direct fuel injection diesel engine for which the top face of a piston projects in a pentroof shape is known from Patent Publication 1 below.

When the top face of a piston is formed flat, the strength of a squish flow heading from a squish area of an outer peripheral part of the top face of the piston toward a cavity recessed in a central part of the piston is uniform in the circumferential direction. However, with regard to a piston having a pentroof-shaped top face, since the angle formed by the top face thereof and a side wall of a cavity changes in the circumferential direction, the strength of squish flow is nonuniform in the circumferential direction, and uniform mixing of air and fuel is inhibited, thus giving rise to the problem of an increase in harmful exhaust substances. In the arrangement described in Patent Publication 1 above, the angle formed by the top face of the piston and the side wall of the cavity is made constant in the circumferential direction by changing the shape of the side wall of the cavity in the circumferential direction, thus making the strength of squish flow uniform.

Patent Publication 1: Japanese Patent Application Laid-open No. 63-16124

DISCLOSURE OF INVENTION

Problems to be Solved by the Invention

It is known that the strength of a squish flow generated by a piston having a pentroof-shaped top face is dependent on the ratio of cavity entrance diameter to cylinder bore diameter, that is, on the radial width of a squish area. For a piston having a pentroof-shaped top face, if the distance traveled by fuel injected from each injection hole of a fuel injector into the cavity is set so as to be equal, the shape of the cavity entrance becomes ellipsoidal, and the radial width of the squish area changes in the circumferential direction. Specifically, there is the problem that in a portion where the width of the squish area is wide (portion where top face of piston is low) the squish flow is strong, and in a portion where the width of the squish area is narrow (portion where top face of piston is high) the squish flow is weak.

The present invention has been accomplished in the light of the above-mentioned circumstances, and it is an object thereof to promote mixing of fuel and air by making the strength of squish flow uniform in the piston circumferential direction in a direct fuel injection diesel engine having a piston with a pentroof-shaped top face.

Means for Solving the Problems

In order to attain the above object, according to a first aspect of the present invention, there is provided a direct fuel injection diesel engine comprising a piston for which the height of a top face changes in the circumferential direction, and a fuel injector for injecting fuel into a cavity recessed in a central part of the piston, a ratio D/B of a cavity entrance diameter D to a cylinder bore diameter B in a plane perpendicular to a piston central axis changing in the circumferential direction, characterized in that a squish clearance formed between the top face of the piston radially outside the cavity and a lower face of a cylinder head increases in response to a decrease in the ratio D/B and decreases in response to an increase in the ratio D/B.

According to a second aspect of the present invention, there is provided a direct fuel injection diesel engine comprising a piston for which the height of a top face changes in the circumferential direction, and a fuel injector for injecting fuel into a cavity recessed in a central part of the piston, a ratio D/B of a cavity entrance diameter D to a cylinder bore diameter B in a plane perpendicular to a piston central axis changing in the circumferential direction, characterized in that a cutout is formed in at least one of a portion of the top face of the piston where the ratio D/B is a minimum and a portion of a cylinder head that faces the portion.

EFFECTS OF THE INVENTION

In accordance with the first aspect of the present invention, when the ratio of the entrance diameter D of the cavity recessed in the central part of the piston to the cylinder bore diameter B is D/B, the squish clearance formed between the top face of the piston and the lower face of the cylinder head is set large where the ratio D/B is small, that is, where the radial width of the squish area is large, and is set small where the ratio D/B is large, that is, where the radial width of the squish area is small, and it is thereby possible to make the strength of the squish flow and the reverse squish flow uniform in the circumferential direction of the piston, thus promoting uniform mixing of air and fuel and reducing harmful exhaust substances.

Furthermore, in accordance with the second aspect of the present invention, when the ratio of the entrance diameter D of the cavity recessed in the central part of the piston to the cylinder bore diameter B is D/B, by forming a cutout in at least one of a portion where the ratio D/B is small, that is, where the radial width of the squish area is large, and a portion of the cylinder head facing the portion, it is possible to make the strength of the squish flow and the reverse squish flow uniform in the circumferential direction of the piston, thus promoting uniform mixing of air and fuel and reducing harmful exhaust substances.

EXPLANATION OF REFERENCE NUMERALS AND SYMBOLS

13 Piston
13e Cutout
16 Cylinder head
23 Fuel injector
25 Cavity
Lp Piston central axis
H Squish clearance

BEST MODE FOR CARRYING OUT THE INVENTION

Modes for carrying out the present invention are explained by reference to the attached drawings.

Embodiment 1

FIG. 1 to FIG. 7 show a first embodiment of the present invention.

Figure 1:
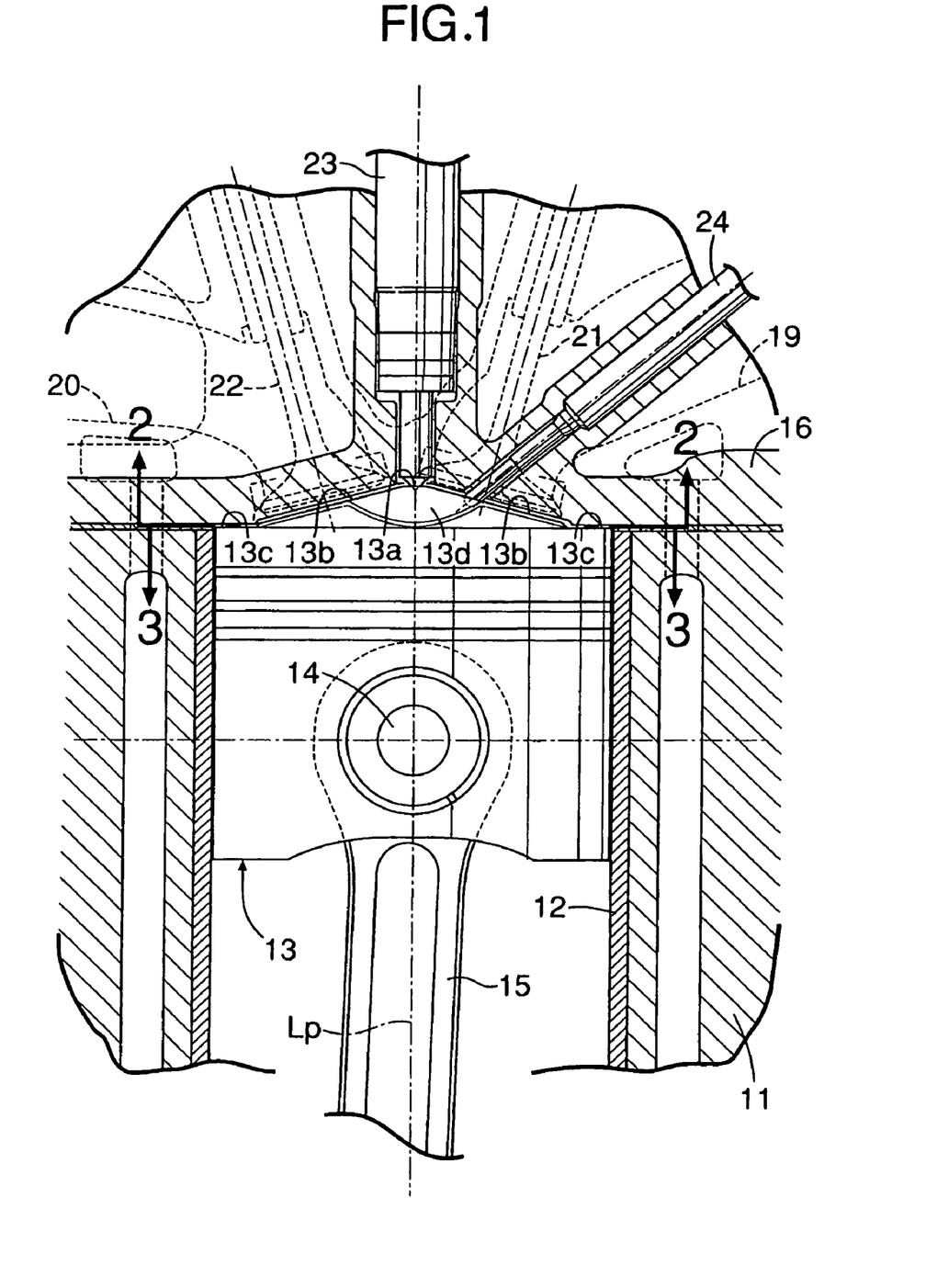
FIG. 1 is a vertical sectional view of an essential part of a diesel engine related to a first embodiment (first embodiment).
Figure 2:
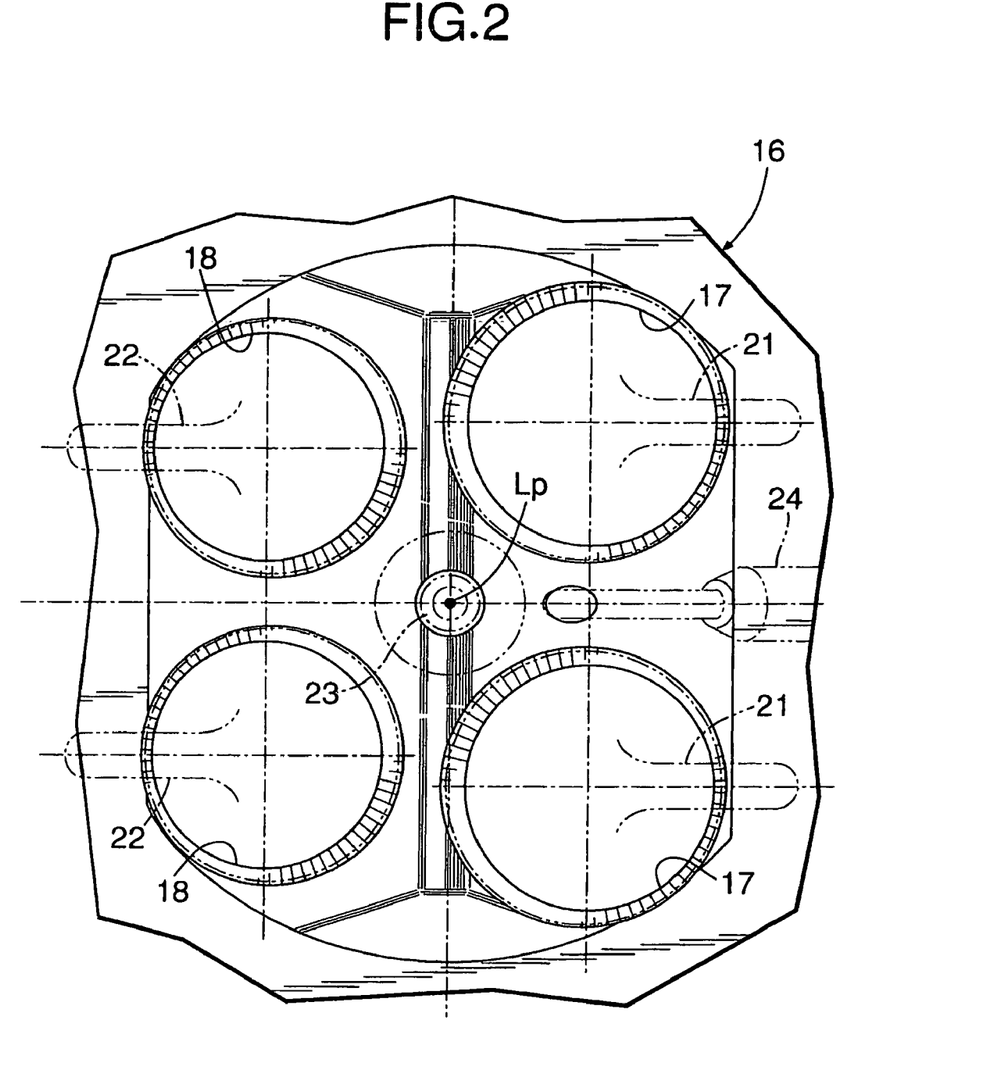
FIG. 2 is a view from arrowed line 2-2 in FIG. 1 (first embodiment).
Figure 3:
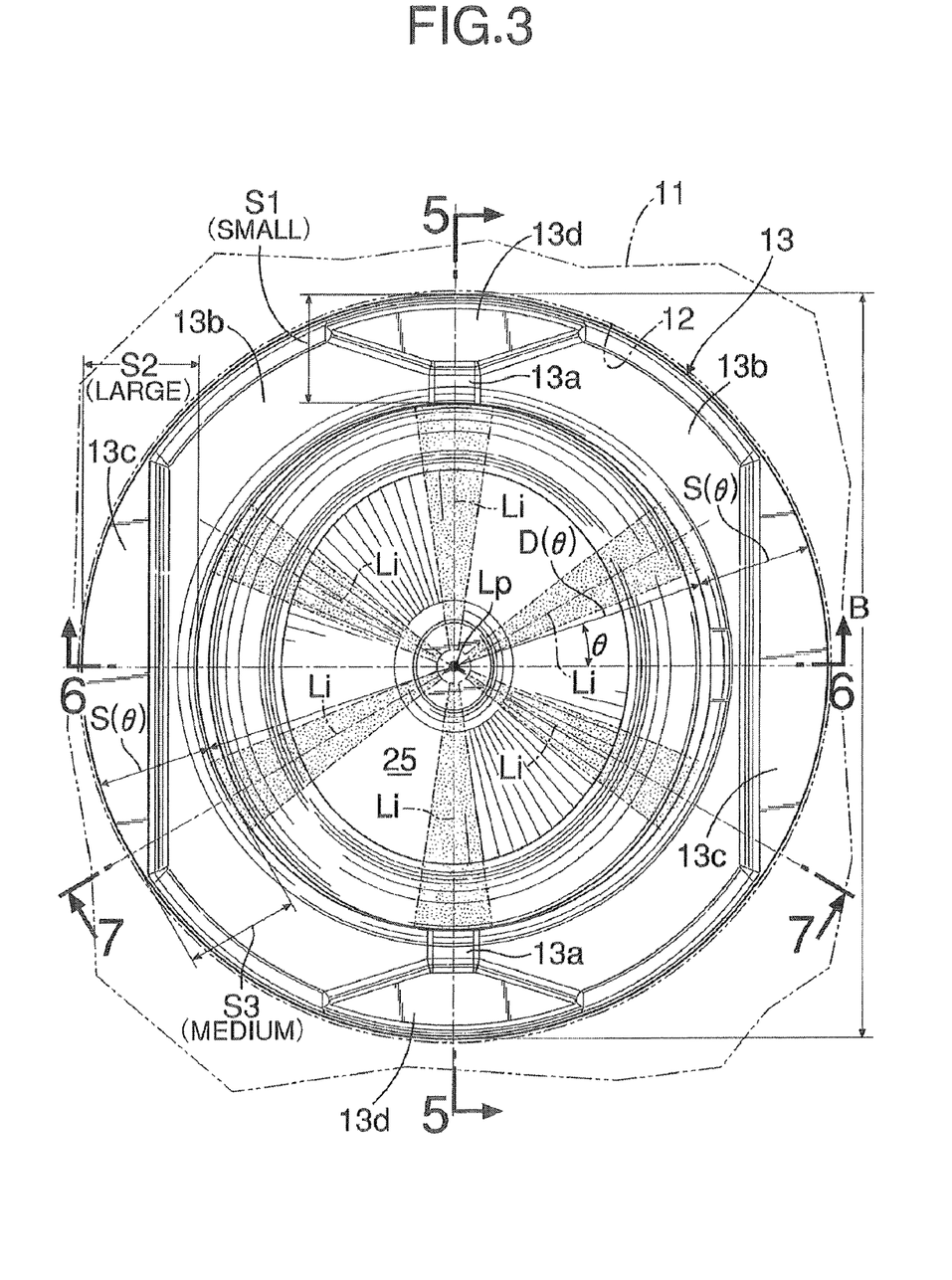
FIG. 3 is a view from arrowed line 3-3 in FIG. 1 (first embodiment).

As shown in FIG. 1 to FIG. 3, a direct fuel injection type diesel engine includes a piston 13 slidably fitted into a cylinder 12 formed in a cylinder block 11, and the piston 13 is connected to a crankshaft (not illustrated) via a piston pin 14 and a connecting rod 15. Two intake valve holes 17 and 17 and two exhaust valve holes 18 and 18 facing a top face of the piston 13 open in a lower face of a cylinder head 16, which is joined to an upper face of the cylinder block 11, an intake port 19 communicates with the intake valve holes 17 and 17, and an exhaust port 20 communicates with the exhaust valve holes 18 and 18. The intake valve holes 17 and 17 are opened and closed by intake valves 21 and 21, and the exhaust valve holes 18 and 18 are opened and closed by exhaust valves 22 and 22. A fuel injector 23 is provided so as to be positioned above a piston central axis Lp, and a glow plug 24 is provided so as to be adjacent to the fuel injector 23.

Figure 4:
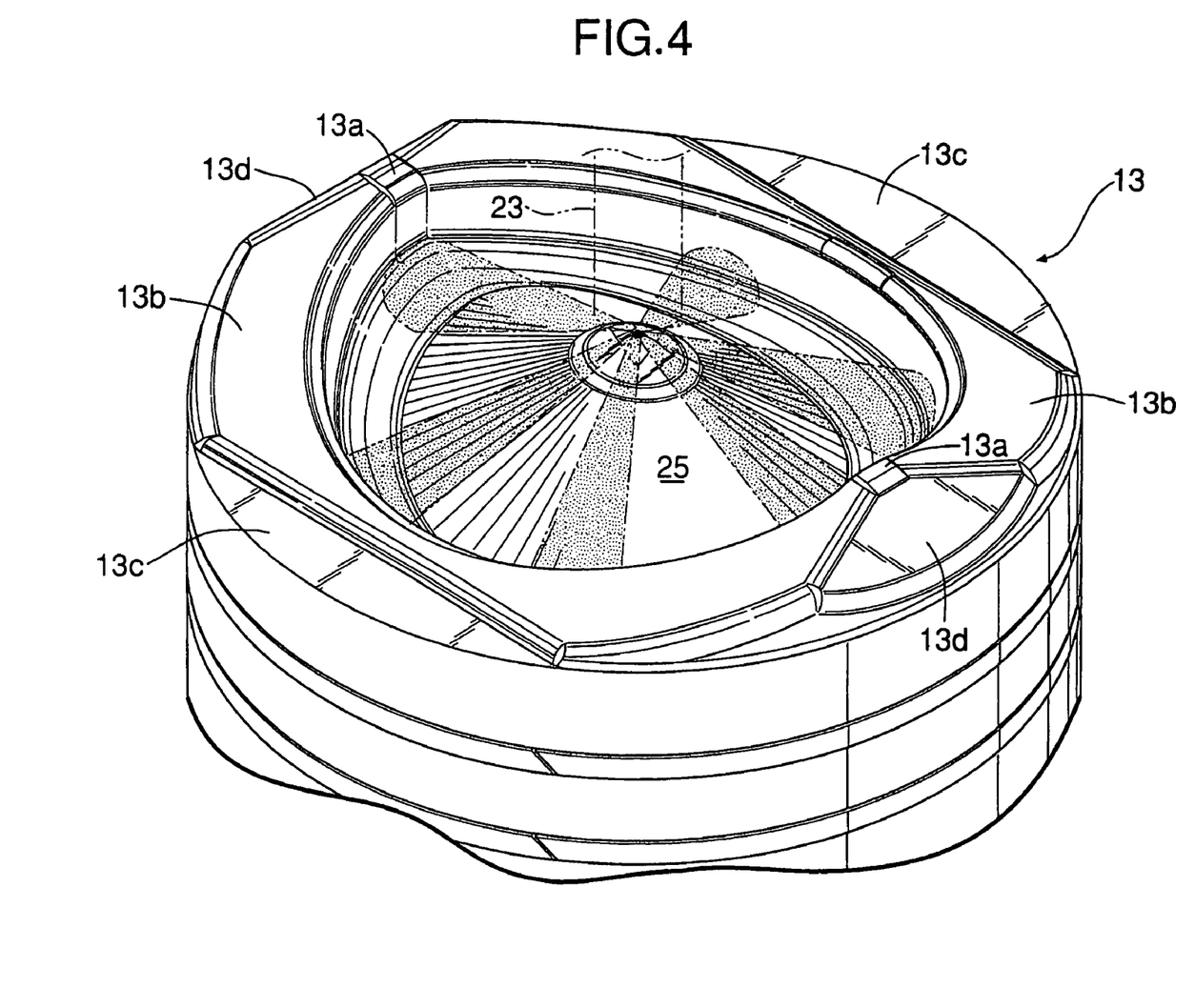
FIG. 4 is a perspective view of an upper part of a piston (first embodiment).

As is clear from FIG. 1 and FIG. 4, the top face of the piston 13 and the lower face of the cylinder head 16 facing it are not flat but are inclined in a pentroof shape with a triangular cross-section, and due to this shape it is possible to reduce the degree of curvature of the intake port 19 and the exhaust port 20, guarantee a diameter for the intake valve holes 17 and 17 and the exhaust valve holes 18 and 18, and enhance the intake efficiency and the exhaust efficiency.

A cavity 25 with the piston central axis Lp as its center is recessed in the top face of the piston 13. Formed radially outside the cavity 25 are a pair of inclined faces 13b and 13b inclined downward to the intake side and the exhaust side from top portions 13a and 13a extending linearly parallel to the piston pin 14, a pair of flat faces 13c and 13c formed in the vicinity of the lower end of the inclined faces 13b and 13b so as to be perpendicular to the piston central axis Lp, and a pair of chamfered portions 13d and 13d formed by cutting out opposite ends of the top portions 13a and 13a.

With regard to an inner wall face of the cavity 25, a portion adjacent to the outer periphery is most deeply indented, and it is inclined upward therefrom toward the piston central axis Lp, and projects upward so that a portion on the piston central axis Lp is raised. The fuel injector 23 sprays fuel in six directions spaced at intervals of 60° with one point on the piston central axis Lp as the center. Among six spray axes Li, two thereof are parallel to the direction of the piston pin 14 when viewed in the piston central axis Lp direction, and the other four are inclined at 60° relative to the piston pin 14 direction. Furthermore, the six spray axes Li are inclined downward when viewed in a direction perpendicular to the piston central axis Lp and directed to the deepest portion of the outer peripheral part of the cavity 25.

When the piston 13 is at top dead center, an annular squish area 26 is formed between the top portions 13a and 13a, inclined faces 13b and 13b, flat faces 13c and 13c, and chamfered portions 13d and 13d on the top face of the piston 13 and the lower face of the cylinder head 16. The shape of the cavity 25 when viewed in the piston central axis Lp direction is elliptical, with a major axis coinciding with the direction of the piston pin 14. This is because the top face of the piston 13 is not flat but pentroof-shaped.

The radial width of the squish area 26, that is, the width of the inclined face 13b and 13b, flat face 13c and 13c, and chamfered portion 13d and 13d portions, is not constant, and varies in the circumferential direction of the piston 13. That is, a ratio D/B of a cavity entrance diameter D (variable value) to a cylinder bore diameter B (constant value) in a plane perpendicular to the piston central axis Lp changes in the circumferential direction of the piston 13.

Figure 5:
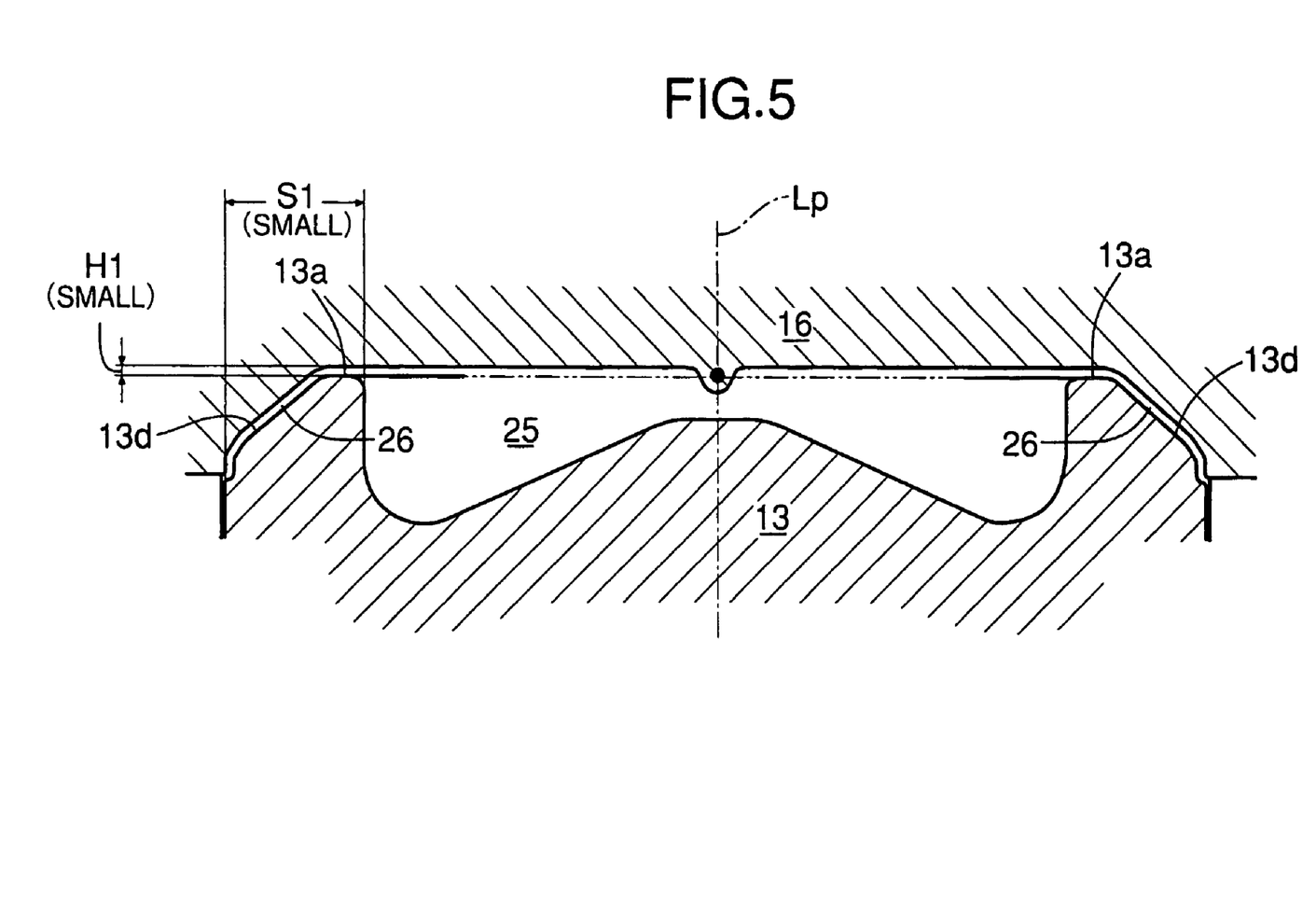
FIG. 5 is a sectional view along line 5-5 in FIG. 3 (first embodiment).

FIG. 5 is a vertical section of the piston 13 along the piston pin 14 direction. At this sectional position, the piston 13 is sectioned along the linear top portions 13a and 13a, and the chamfered portions 13d and 13d inclined downward are formed at opposite ends of the top portions 13a and 13a. A width S1 of the squish area 26 at the position of the chamfered portions 13d and 13d is a minimum in the circumferential direction of the piston 13, and a squish clearance H1 between the top face of the piston 13 and the lower face of the cylinder head 16 at this position is also a minimum in the circumferential direction of the piston 13.

Figure 6:
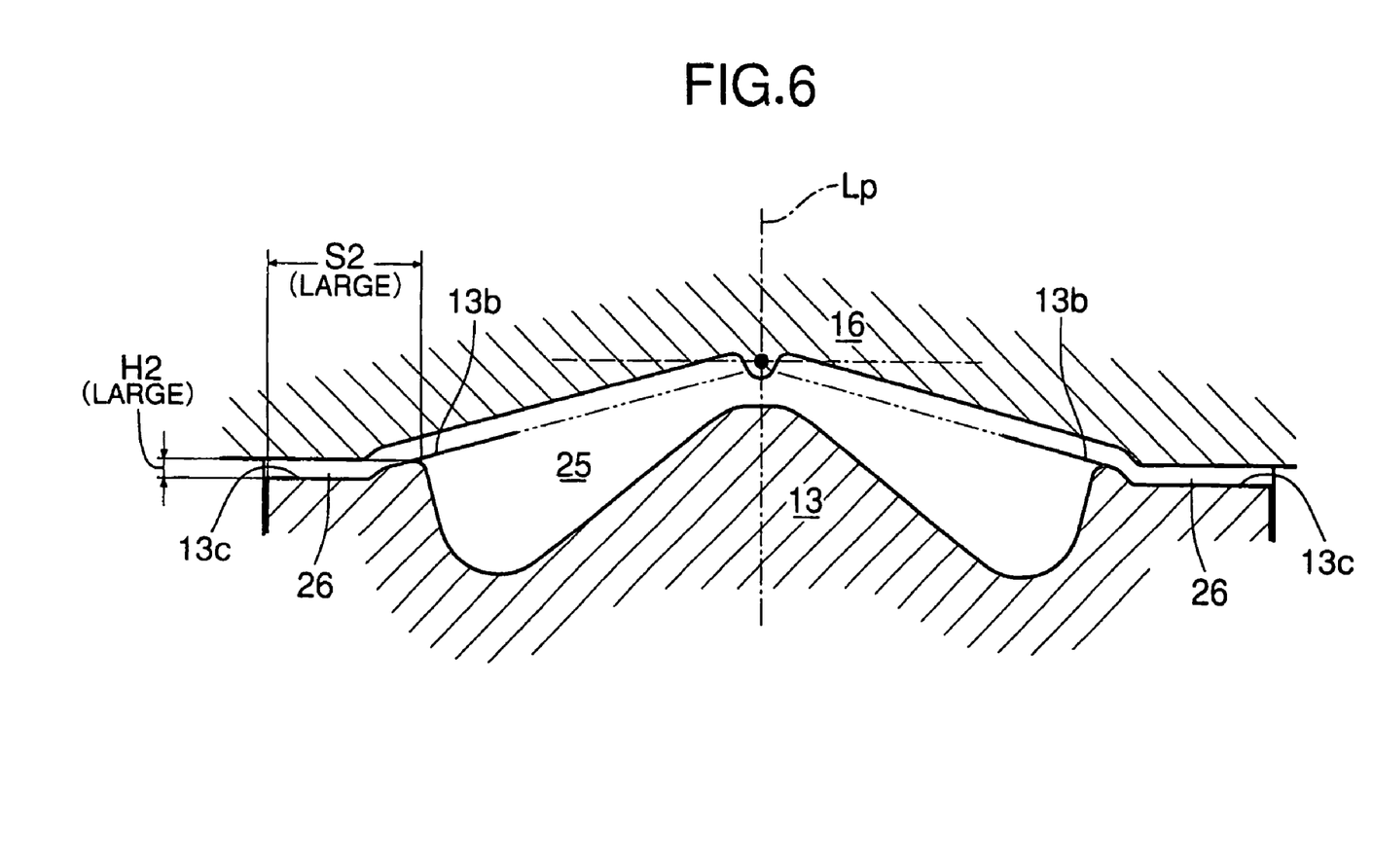
FIG. 6 is a sectional view along line 6-6 in FIG. 3 (first embodiment).

FIG. 6 is a vertical section of the piston 13 along a direction perpendicular to the piston pin 14, and at this sectional position the piston 13 is sectioned in the flat faces 13c and 13c. A width S2 of the squish area 26 at the position of the flat faces 13c and 13c is a maximum in the circumferential direction of the piston 13, and a squish clearance H2 between the top face of the piston 13 and the lower face of the cylinder head 16 at this position is also a maximum in the circumferential direction of the piston 13.

Figure 7:
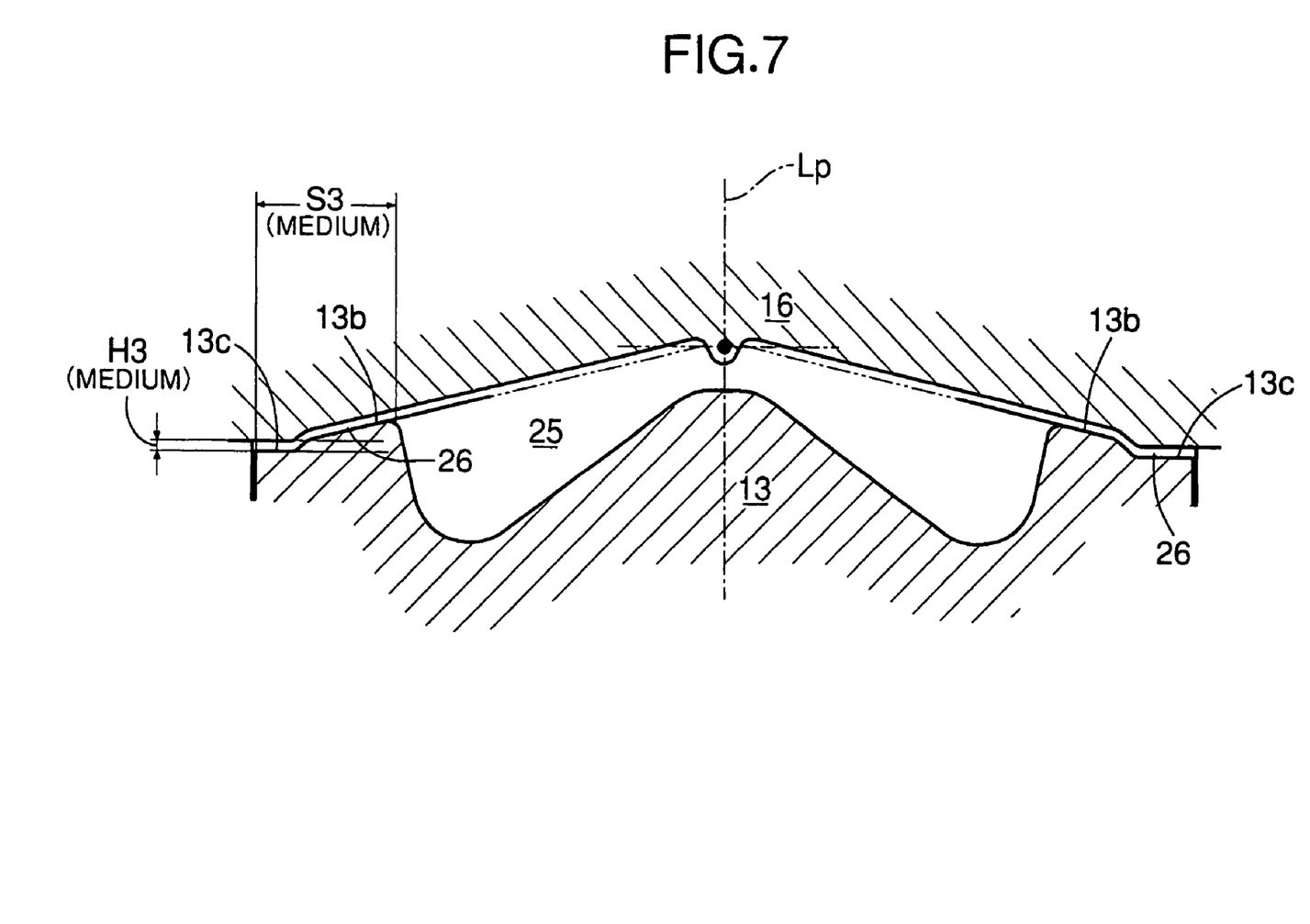
FIG. 7 is a sectional view along line 7-7 in FIG. 3 (first embodiment).

FIG. 7 is a vertical section of the piston 13 along a direction at 60° relative to the piston pin 14, and at this sectional position the piston 13 is sectioned in the inclined faces 13b and 13b. A width S3 of the squish area 26 at the position of the inclined faces 13b and 13b is a value between the two widths S1 and S2, and a squish clearance H3 between the top face of the piston 13 and the lower face of the cylinder head 16 at the position is also a value between the two heights H1 and H2.

As described above, when the ratio D/B of the cavity entrance diameter D to the cylinder bore diameter B increases, that is, when the width S of the squish area 26 decreases, the squish clearance H becomes small, and when the ratio D/B decreases, that is, when the width S of the squish area 26 increases, the squish clearance H becomes large. More specifically, the width S (θ) and the squish clearance H (θ) of the squish area 26, which are functions of an angle θ around the piston central axis Lp, are set so as to satisfy the relationship S (θ)/H (θ)=constant.

In this way, in the compression stroke, when the piston 13 travels upwards a squish flow in which air present in the squish area 26 on the outer periphery of the piston 13 flows toward the center of the cavity 25 occurs, thus promoting mixing with fuel injected by the fuel injector 23. In this process, if the width S of the squish area 26 is small the squish flow becomes weak and if the width S of the squish area 26 is large the squish flow become strong, if the width S of the squish area 26 is nonuniform in the circumferential direction the strength of the squish flow therefore also becomes nonuniform in the circumferential direction, and there is a possibility that mixing of air and fuel will be insufficient.

On the other hand, if the squish clearance H is small the squish flow becomes strong and if the squish clearance H is large the squish flow becomes weak, and because of this, as described above, by setting the width S (θ) and the squish clearance H (θ) of the squish area 26 so as to satisfy S (θ)/H (θ)=constant, it is possible to make the strength of the squish flow uniform in the circumferential direction, thus sufficiently mixing air and fuel, improving the combustion conditions for the gas mixture, and reducing harmful exhaust substances.

When the piston 13 travels downwards, a reverse squish flow heading radially outward from the cavity 25 to the squish area 26 occurs, and in accordance with the present embodiment, the strength of the reverse squish flow can be made uniform in the circumferential direction in the same manner as for the squish flow.

Embodiment 2

Figure 8:
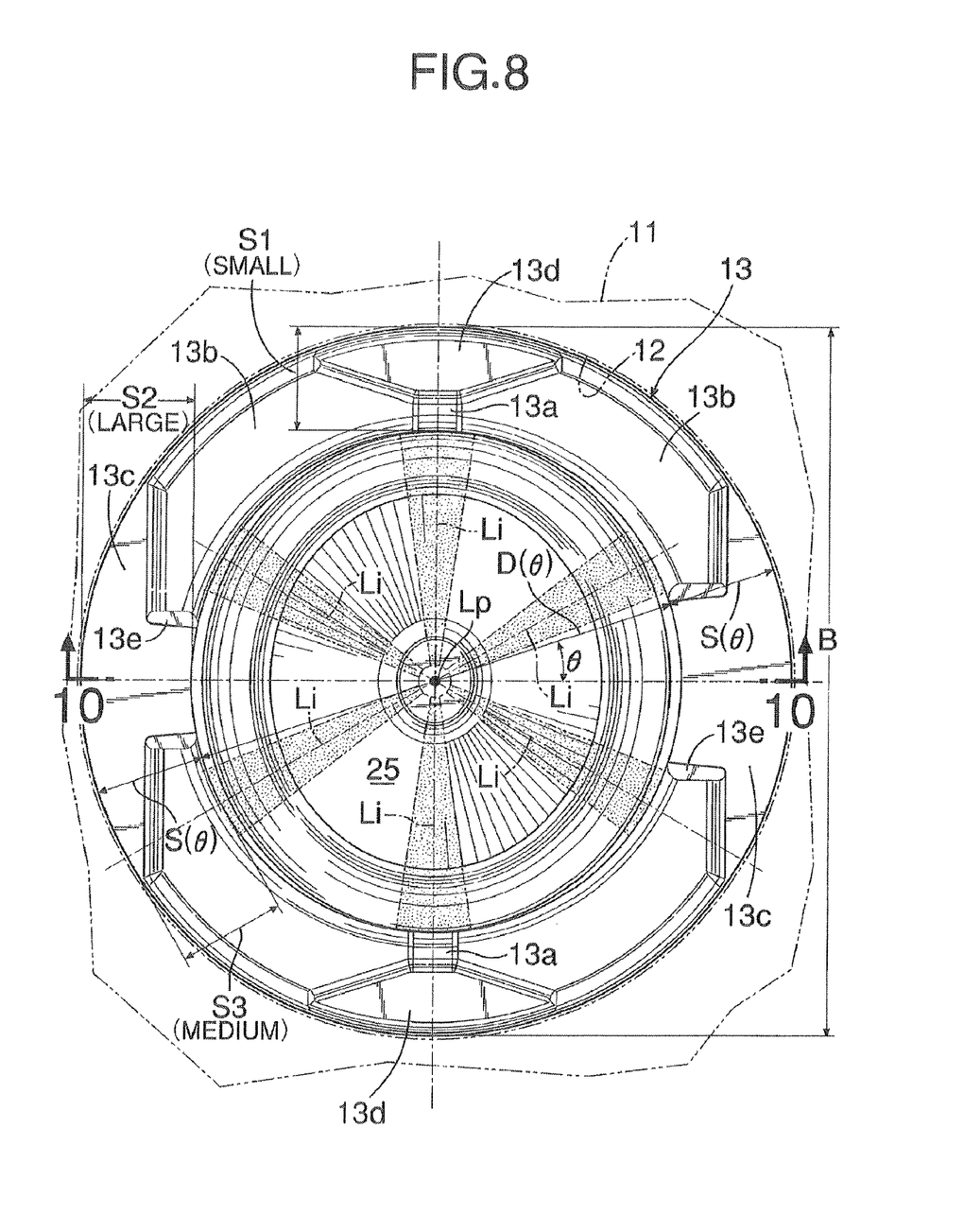
FIG. 8 is a view showing a top face of a piston related to a second embodiment (second embodiment).
Figure 9:
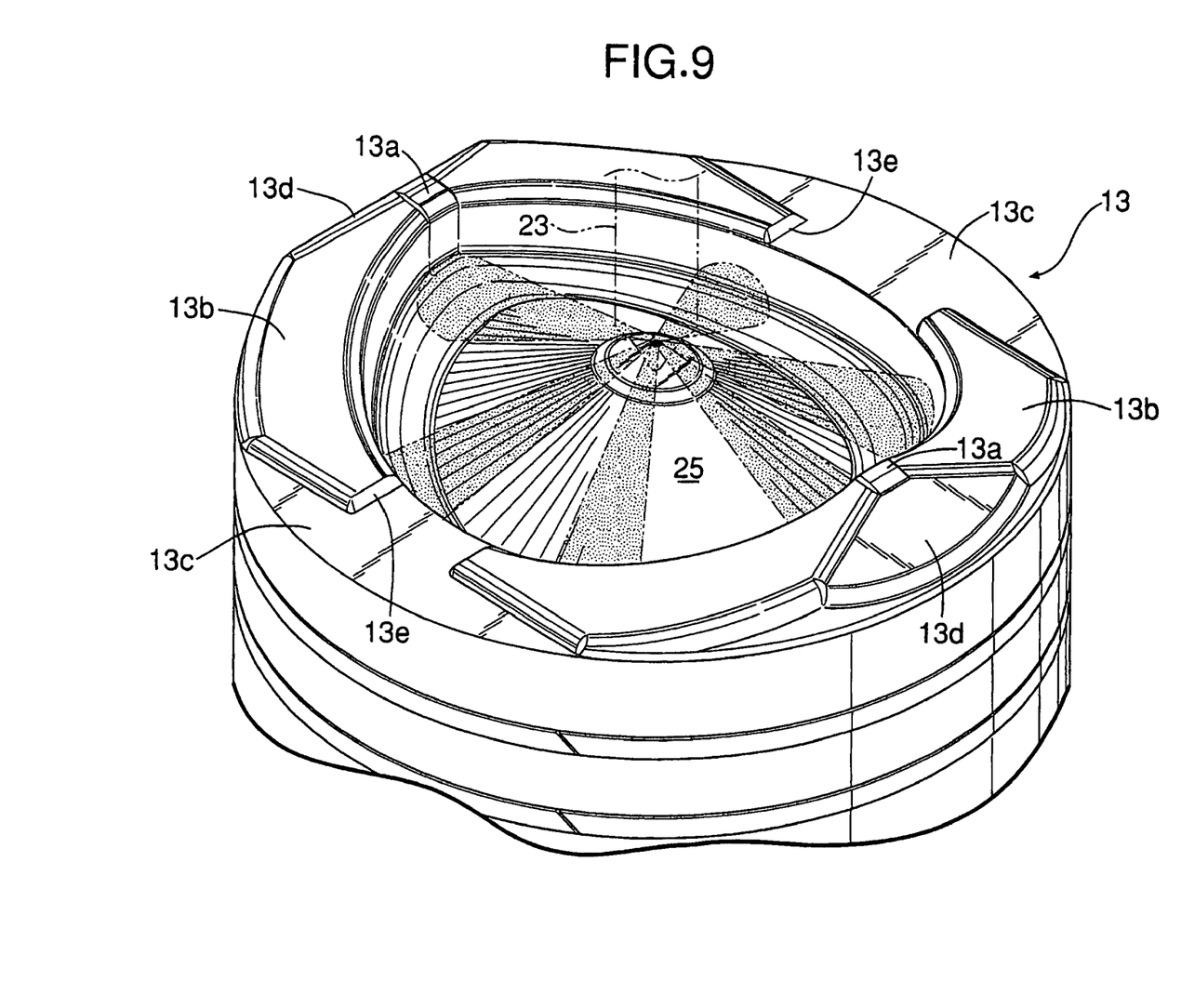
FIG. 9 is a perspective view of an upper part of the piston (second embodiment).
Figure 10:
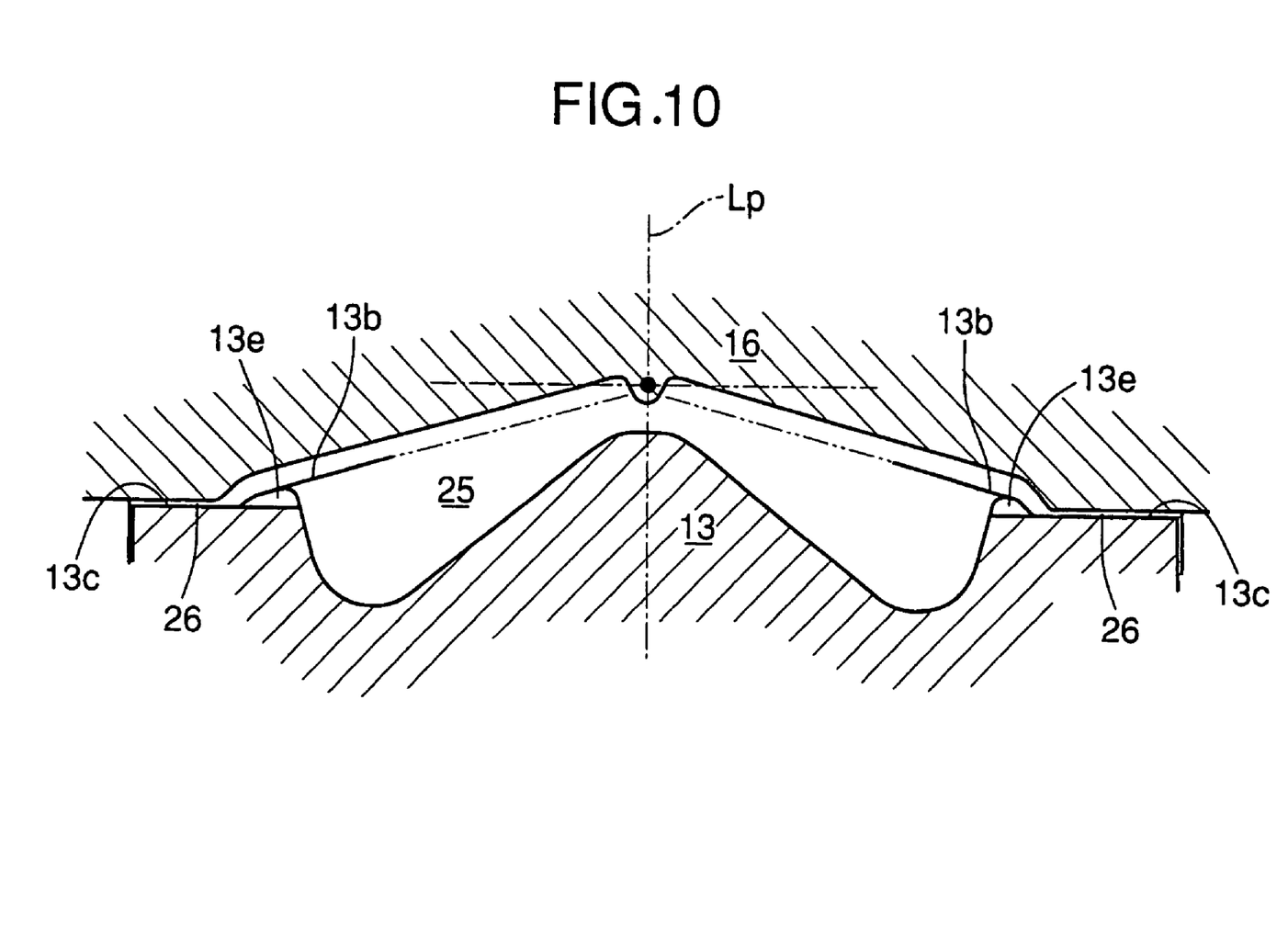
FIG. 10 is a sectional view along line 10-10 in FIG. 8 (second embodiment).

FIG. 8 to FIG. 10 show a second embodiment of the present invention.

In the second embodiment, a ratio D/B (that is, a width S of a squish area 26) of a cavity entrance diameter D to a cylinder bore diameter B changes in the circumferential direction as in the first embodiment, but the length of a squish clearance H is set so that it is constant in the circumferential direction.

Instead, formed between a cavity 25 and flat faces 13c and 13c where the width of the squish area 26 becomes a maximum are cutouts 13e and 13e, which are connected to the flat faces 13c and 13c at the same height. By forming the cutouts 13e and 13e in a portion in which squish flow tends to become strong due to a width S of the squish area 26 being large, the squish flow is weakened, thus giving the same effects as those when the squish clearance H is increased, and as in the first embodiment it is possible to make the strength of the squish flow uniform in the circumferential direction, thus sufficiently mixing air and fuel, improving the combustion conditions for the gas mixture, and reducing harmful exhaust substances.

Embodiments of the present invention are explained above, but the present invention may be modified in a variety of ways as long as the modifications do not depart from the spirit and scope thereof.

For example, in the second embodiment the cutouts 13e and 13e are provided on a piston 13 side, but the cutouts 13e and 13e may be provided on a cylinder head 16 side or may be provided both on the piston 13 side and the cylinder head 16 side.

The invention claimed is:

1. A direct fuel injection diesel engine comprising a piston for which the height of a top face changes in the circumferential direction, and a fuel injector for injecting fuel into a cavity recessed in a central part of the piston, a ratio D/B of a cavity entrance diameter D to a cylinder bore diameter B in a plane perpendicular to a piston central axis changing in the circumferential direction,
   characterized in that a squish clearance formed between the top face of the piston radially outside the cavity and a lower face of a cylinder head increases in response to a decrease in the ratio D/B and decreases in response to an increase in the ratio D/B.

2. The direct fuel injection diesel engine according to claim 1, wherein a relationship between the squish clearance (H) and a width (S) of a squish area formed between the top face of the piston radially outside the cavity and the lower face of the cylinder head is set to satisfy S/H =constant in a circumferential direction of the piston.

3. The direct fuel injection diesel engine according to claim 2, wherein the shape of the cavity when viewed in a central axis direction of the piston is elliptical, with a major axis coinciding with a direction of the piston pin.

* * * * *